United States Patent
Pité

[19]

[11] Patent Number: 6,167,276

[45] Date of Patent: Dec. 26, 2000

[54] METHOD TO LOCALIZE A MOBILE TELEPHONE

[75] Inventor: Éric Pité, Sartrouvik, France

[73] Assignee: Sagem SA, Paris, France

[21] Appl. No.: 09/365,499

[22] Filed: Aug. 2, 1999

[30] Foreign Application Priority Data

Aug. 4, 1998 [FR] France .................................. 98 10231

[51] Int. Cl.$^7$ .................................................. H04Q 7/20
[52] U.S. Cl. .......................................... 455/456; 342/450
[58] Field of Search .................................. 455/456, 457, 455/67.1, 422, 524; 342/450, 458, 463; 701/300

[56] References Cited

U.S. PATENT DOCUMENTS 6,011,974  1/2000  Cedervall et al. ...................... 455/456

FOREIGN PATENT DOCUMENTS 0 800 319  10/1997  European Pat. Off. .
WO 98/19488  5/1998  Finland .

*Primary Examiner*—Nguyen Vo
*Attorney, Agent, or Firm*—Nilles & Nilles SC

[57] ABSTRACT

To enable the localizing of a mobile telephone in a network of base transceiver stations, it is planned that the mobile telephone will undertake an exchange with a base transceiver station. In this exchange, this station will send it an absolute time so that the mobile telephone can temporarily locate itself with respect to this absolute time. During this exchange, the first base transceiver station furthermore sends the mobile telephone a piece of information τ1 on the distance between them. Then, at least two other base stations send different absolute times which are exploited by the mobile telephone to compute its position in the network by triangulation.

13 Claims, 3 Drawing Sheets

METHOD TO LOCALIZE A MOBILE TELEPHONE

BACKGROUND OF THE INVENTION

1. Field of the Invention

An object of the present invention is a method to localize or determine the position of a mobile telephone in a network of base transceiver stations. An object of the invention is to provide new possibilities for the use of mobile telephones and to improve radiocommunications systems.

2. Description of the Prior Art

In the field of mobile telephony, it is becoming increasingly necessary to localize or determine the position of mobile telephones during conversation and, possibly, even all the time. In practice, in the U.S., the FCC (the Federal Communications Commission) stipulates that mobile telephones should be located with a precision of less than 125 meters, for 67% of the time. In other words, position-finding is becoming a necessity for mobile radiotelephones of future generations.

Briefly, determining the position of mobile telephones enables a mobile telephone to be located, during use, when it has been stolen. This may provide indications on how to find the thief. Furthermore, in the event of an emergency, the sole fact that a user communicates his location may enable action by rescue workers. More generally, geographical localization makes it possible to supply users with messages, possibly advertisements, related to the place in which they are located.

The methods of localization that can be envisaged include the installation, in each mobile telephone, of a GPS (Global Positioning System) detector by which the mobile telephone would pick up transmissions from satellites in order to know its position. Although this technique is quite developed, it is not possible, for reasons of cost, to consider installing it at present in mobile telephones. For, it necessitates the use of specific equipment.

Other solutions can be considered and are described in Chris Drane and Chris Rizos, "Positioning Systems in Intelligent Transportation Systems," Artech House Books, Boston & London, Jan. 31, 1998. This document considers the carrying out of localizing operations by angle of arrival. This system however requires the making of numerous overhead lines to discriminate between radioelectric signals received on several lobes and designate a direction of arrival of the transmissions received. On the basis of at least three directions (on the basis of at least three base transceiver stations), it is possible to locate the position of the sending mobile telephone. This approach has the drawback wherein numerous overhead lines requiring lots of space have to be installed for each base transceiver station, on the frontage of the houses. This cannot always be done, especially for decorative reasons. Furthermore, in this case, it may happen that the mobile cannot be localized. It must transmit so that the base transceiver stations can localize it.

A second approach envisaged is a time measurement. Using a measurement of a date of arrival of radioelectric signals at a base transceiver station or a mobile telephone, it is possible in theory to determine the distance of a mobile telephone from a base transceiver station. By combining information on the distance of the mobile telephone from several base transceiver stations, it is possible to determine the location of this mobile telephone.

In the prior art, a measurement of arrival time is already performed by a base transceiver station, in existing installations. This measurement is aimed at ensuring that transmissions coming from a mobile telephone reach this base transceiver station so that they are synchronized with the reception frame of this base transceiver station. Thus, especially within the context of GSM type mobile telephony, in 4.6 millisecond frame, there are eight 577-microsecond temporal windows. Given that a geographical cell governed by a base transceiver station can have a size with a diameter of 30 kilometers, the maximum distance of propagation envisaged for the propagation of a wave is about 30 kilometers. For propagation at the speed of light, this leads to phase delays of up to 300 microseconds. This is a considerable amount of time in relation to the duration of the temporal windows. In order to obtain, at the position of a base transceiver station, a presence of significant bits during 5-microsecond microwindows (corresponding to a channel passband of 200 Khz), it has been planned to measure arrival times with 60 delay levels, constituting in practice 64 levels.

For a mobile telephone very close to the base transceiver station, the temporal delay will be zero.

For a distant mobile telephone, the time lag and, therefore, a time advance TA, should corresponding to 300 microseconds. To inform the mobile of the duration of time advance TA to be implemented, a base transceiver station sends it a TA message encoded on six bits (for 64 levels) enabling this lead to be determined.

In practice, this lead is synchronous with a period of propagation, and it is also synonymous with a distance of the mobile from the base transceiver station in 64 concentric rings around it: namely rings with widths of about 1100 meters. Although the precision thus obtained is not insignificant, it is not sufficient to correspond to the requirements of the standard. Ultimately, the use of the TA information representing this time advance cannot be exploited to locate the mobile telephone with sufficient precision. Modifying this technique to increase the precision of the TA information would furthermore have the drawback of requiring the technological modification of all the base transceiver stations and all the mobile telephones: this is unrealistic.

It is an object of the invention to overcome these drawbacks, namely to enable effective localizing through the use of existing equipment without requiring any technological modification, and with the required precision under present conditions. The approach of the invention consists, in its principle, in sending a message from a base transceiver station to a mobile telephone. This message has a piece of information on an absolute time pertaining to this base transceiver station. The mobile telephone which receives the message knows, with respect to its own clock, the time at which it receives this message. It also knows how it should furthermore try and reset its internal clock so that it corresponds to the absolute clock whose characteristics have just been sent to it. This sending of absolute time is however affected by an error due to the duration of propagation between the base transceiver station and the mobile telephone.

In the invention, the mobile telephone then sends a response message to the base transceiver station that has sent it the absolute time. This base transceiver station receives this response message. On the basis of the two periods of propagation in the outgoing direction and the return direction between itself and the mobile telephone, the base transceiver station computes a corresponding correction of absolute time. In a second sending operation, the base transceiver station sends information on this correction to the mobile telephone. In receiving this correct information, the mobile telephone, this time permanently, sets its internal clock with respect to the absolute time of the base transceiver station.

SUMMARY OF THE INVENTION

As the correction to be made corresponds to the duration of propagation and to the distance between itself and the base transceiver station, the mobile telephone knows its distance from this station. From at least two other base transceiver stations, identical messages of absolute time are sent at absolute dates that are different or the same. These messages of absolute time are also received by the mobile telephone. In the invention, it is seen to it that the messages of absolute time sent by the base transceiver stations pertain to a single absolute time, at least known to these other base transceiver stations and/or to the mobile telephone. Failing this, the base transceiver stations are synchronized. Thus, the mobile telephone may compute or have its position computed. An object of the invention therefore is a method for the localizing of a mobile telephone in a network of base transceiver stations comprising the following steps:

- a first, second and third base transceiver station are located,
- a first, second and third duration of propagation between the first, second and third base transceiver stations and the mobile telephone are measured respectively,
- the distances between this first, second and third base transceiver stations and the mobile telephone are deduced therefrom, and
- the mobile telephone is localized with these distances and these locations of base transceiver stations, wherein,

- one and the same absolute clock is made known in order to set the times of the base transceiver stations,
- the first base transceiver station sends a first piece of information h1 of an absolute date to the mobile telephone, this first information h1 corresponding to a first absolute date H1 for this first base transceiver station,
- the mobile telephone receives this first piece of information h1 of absolute date and, after a period of waiting known to the first base transceiver station, it sends a response signal,
- the first base transceiver station receives this response signal at another absolute date H'1,
- the first base transceiver station computes a piece of information on propagation τ1 between itself and the mobile telephone on the basis of the difference between the two absolute dates H1 and H'1 and of the known waiting duration,
- the first base transceiver station sends the mobile telephone the piece of information on propagation τ1,
- the second and third base transceiver stations send a second piece of information and third piece of information h2 and h3 on absolute date, and
- the mobile telephone is localized on the basis of these pieces of information h1, h2, h3 on absolute date received by the mobile telephone, their reception date and the information on propagation.

BRIEF DESCRIPTION OF THE DRAWINGS

The invention will be understood more clearly from the following description and the appended figures. These figures are given purely by way of an indication and in no way restrict the scope of the invention. Of these figures.

MORE DETAILED DESCRIPTION

Figure 1:
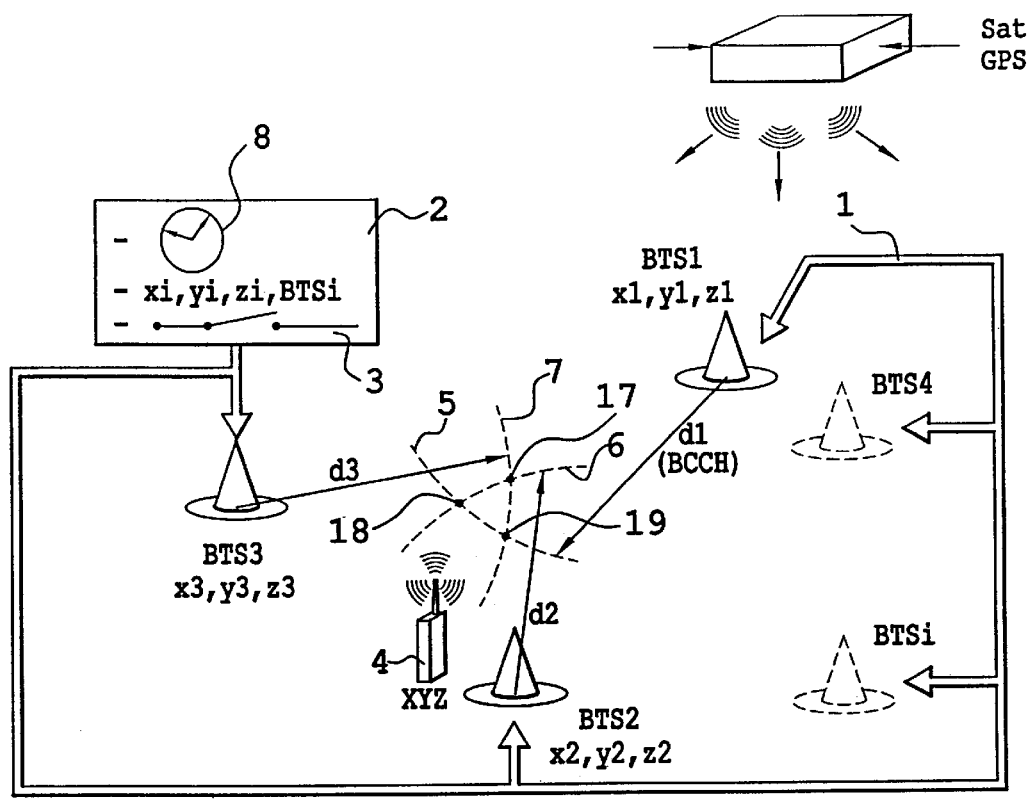
FIG. 1 provides a schematic view of the layout of a mobile telephone in a network of base transceiver stations with respect to which it must be located.

FIG. 1 shows a network of base transceiver stations that can be used to implement the method for localizing a mobile telephone according to the invention. The network comprises, for example, the base transceiver stations BTS1, BTS2 and BTS3. These base transceiver stations form a network and are connected, schematically by a bus 1, between themselves and the central circuit 2 of the network. The base transceiver stations BTS1 to BTS3 all have their positions identified by their geodesic coordinates, schematically represented herein by 3D coordinates $x_i$, $y_i$, $z_i$ in an astronomical system of references that is not shown. This reference system may furthermore be converted into latitude, longitude and altitude references. In practice, the central circuit 2 could include pieces of information $x_i$, $y_i$, $z_i$ in the memory corresponding to any base transceiver station BTSi. The central circuit 2 is normally responsible for performing a switching operation 3 to enable partners to converse with each other in using the mobile telephonic network. A mobile telephone 4 whose X, Y, Z coordinates are unknown must be localized with respect to the base transceiver stations BTS1 to BTS3. In a theoretically known manner, an assessment will first of all be made in the invention of pieces of information representing the distances d1, d2 and d3 between the mobile telephone 4 and each of the base transceiver stations. Using a triangulation, symbolically shown by contours in dashes 5, 6 and 7, it is then possible to find the position of the mobile telephone 4 from these pieces of information. These theoretical computations are described in the article quoted further above as well as in J. H. Reed et al., "An Overview of the Challenges and Progress in Meeting the E911 Requirement for Location Service" in IEEE Communications Magazine, April 1998. This article describes computations that make it possible to ascertain the coordinates X, Y, Z on the basis of the $x_i$, $y_i$, $z_i$ coordinates.

According to an essential characteristic of the invention, one and the same absolute clock is made known to the base transceiver station. This knowledge may be provided in several ways. Either each base transceiver station BTS1 to BTS3 (or BTS4 or BTSi if there are others base transceiver stations) receives the transmissions of a satellite SAT of the GPS system (or any other satellite positioning system such as GLONASS or EGNOSS or the like) which constantly sends it a time of an absolute clock. This absolute time is the same because the satellite SAT is far from the earth and because the base transceiver stations concerned are close to each other (at least on the ground). Or again it is the same because each base transceiver station is linked to a common clock or possesses an atomic clock or in another manner.

In a more simple way, the central circuit 2 will have a circuit 8 sending each base transceiver station an absolute time. The circuit 8 will actually send each base transceiver station an absolute time that already takes account of a distance from these stations to the circuit 2. The pieces of information separated out are communicated by the bus 1 in particular. The bus 1 uses for example a PCM type protocol for this purpose. For example, for a near base transceiver station BTS3, a piece of information on absolute time, 09 hours, 00 minutes, 00 seconds, is communicated at an absolute date 09 hours, 00 minutes, 00 seconds whereas it is communicated to a distant base transceiver station BTS1 at a prior date, for example 08 hours, 57 minutes, 49 seconds. In this way, it is seen to it that all the base transceiver stations, regularly, at an absolute date considered (09 hours, 00 minutes, 00 seconds), receive an indication corresponding to this date. Hereinafter we shall see another way of making one and the same absolute time for the base transceiver stations known (to the mobile telephone in this case).

Figure 2:
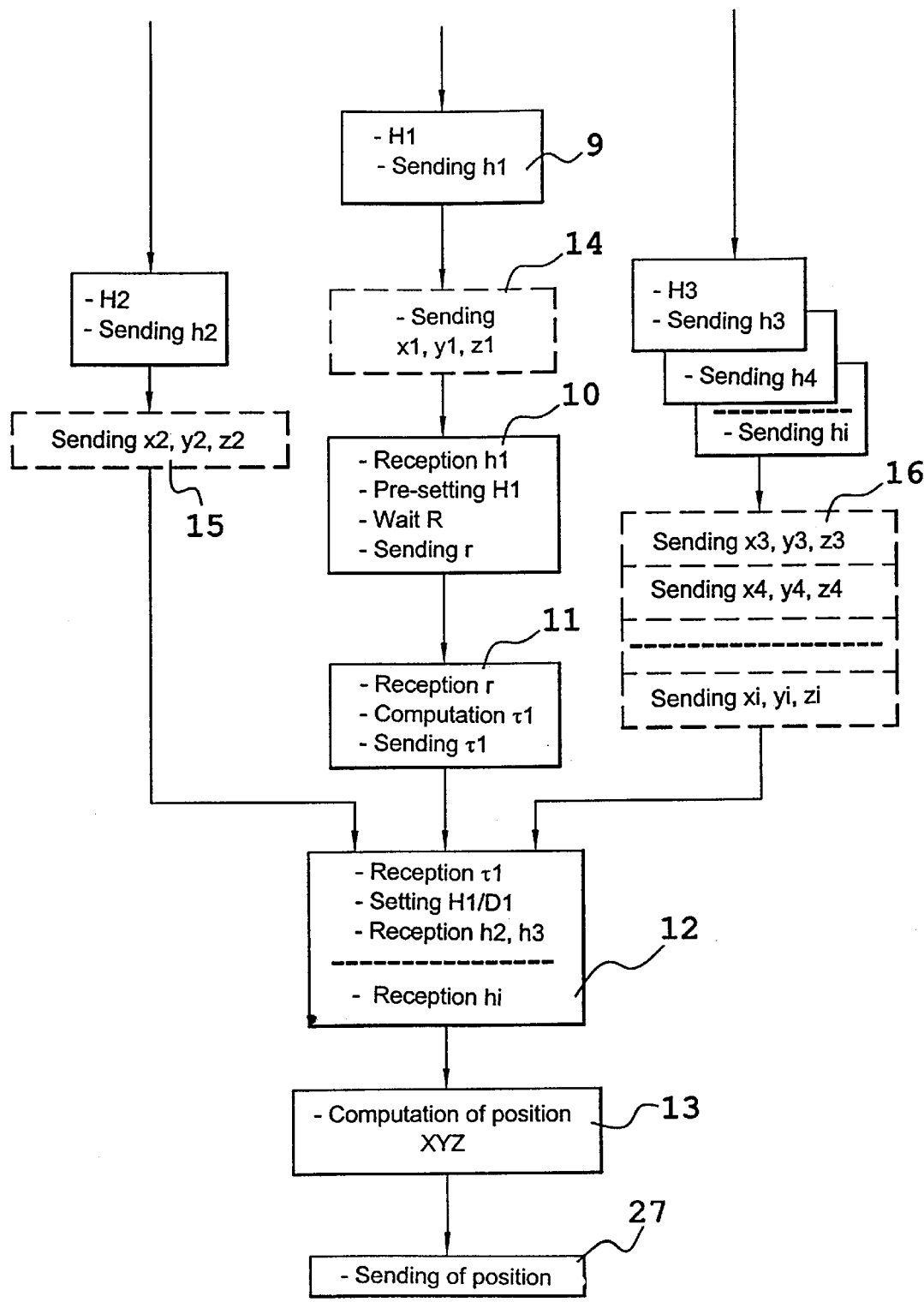
FIG. 2 is a flow chart of the essential steps of the method of localization of the invention.
Figure 3:
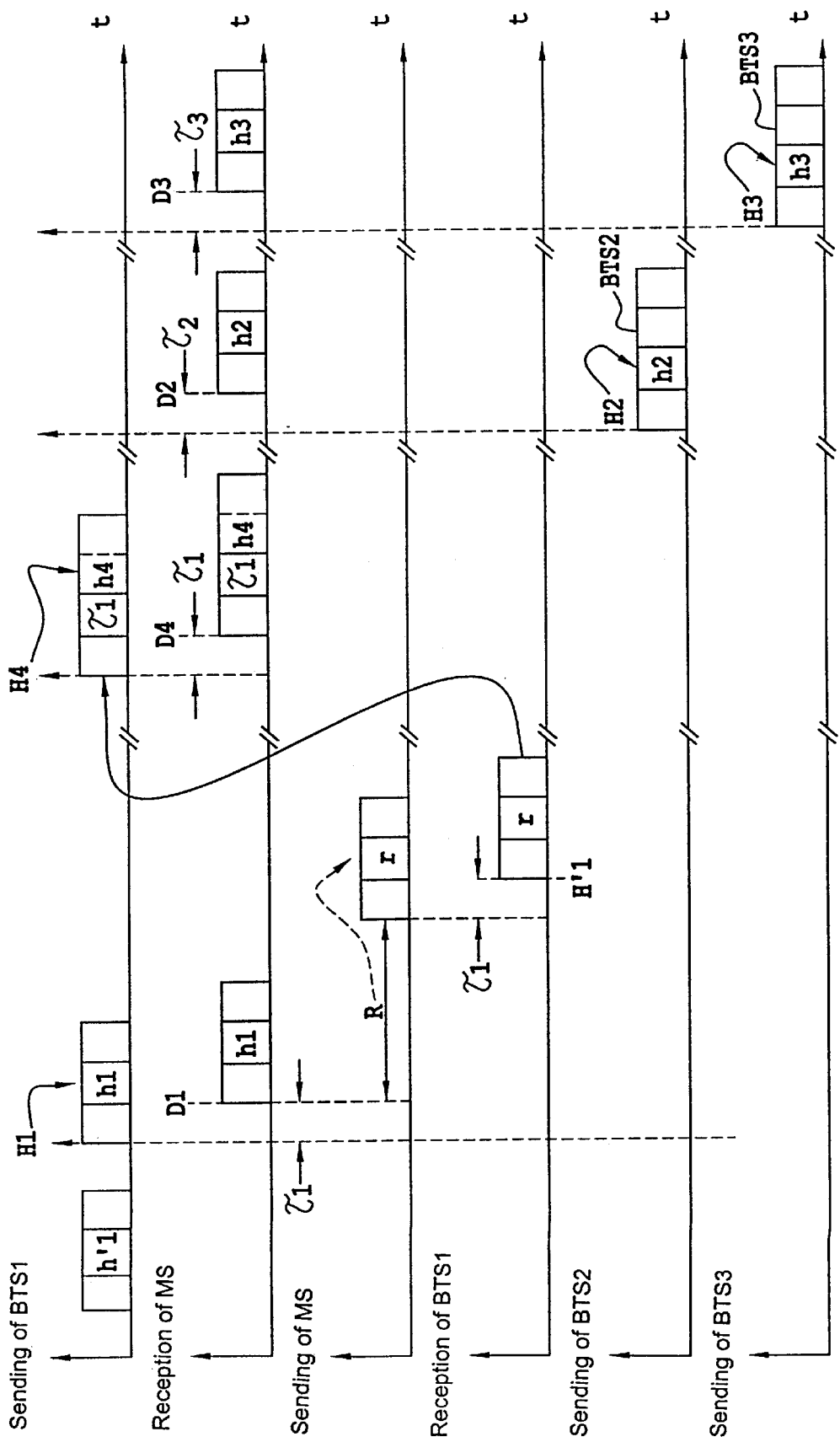
FIG. 3 comprises timing diagrams of signals exchanged according to the method of FIG. 2 between the mobile telephone and each of the base transceiver stations.

As a second characteristic of the invention, the first base transceiver station BTS1 is used to make a first piece of information, representing the absolute time, reach the mobile telephone 4. This sending operation is shown in FIG. 2 and in the timing diagrams of FIG. 3. In a first step 9, FIG. 2, at an absolute date H1 (pertaining to the base transceiver station BTS1), a piece of information h1 representing this date H1 is prepared. It is sent to the mobile telephone from the base transceiver station BST1. This is shown in the first line of the timing diagrams of FIG. 3. Naturally, the preparation of the piece of information h1 may anticipate the sending instant H1. What is important however is that the start of the sending operation should take place in time at the date H1 or at a date referenced with respect to H1. Given a propagation time $\tau 1$ (unknown at the beginning) corresponding to the distance d1 between the base transceiver station BTS1 and the mobile telephone 4, the mobile telephone 4 receives the message sent with a delay $\tau 1$. It receives it at a relative date D1. The date D1 is measured with respect to the internal clock of the mobile telephone 4. During the reception step 10, the mobile telephone 4 which has received the information h1 and measured the relative date D1 can carry out a presetting of its clock with respect to the absolute clock H1. This pre-setting is not truly necessary. A total setting may be done subsequently.

Then, the mobile telephone waits during a waiting period R. It shall be seen hereinafter that the waiting period may be different from one situation to another, especially if, for reasons of synchronization referred to here above, the mobile telephone must send back a message so that it reaches very precisely in a temporal window that is allocated to it by the protocol of the base transceiver station. Essentially, this waiting period R represents a technological delay (in addition to the waiting period) necessary for the mobile telephone to send a response as soon as it receives a signal of this kind. This waiting period may be any period whatsoever (or even zero). What is important is that it shall be known precisely by the base transceiver station for which the response message is intended. Possibly, as shown in the second timing diagram of FIG. 3, the response signal from the mobile telephone may comprise a piece of information r representing the waiting period R if it has been modified with respect to a precise duration. Hereinafter in the explanation, the duration R takes account of the synchronization wait corresponding to the piece of information TA.

Since the mobile telephone 4 sends the response message which may, as the case may be, comprise the information r, this message is received at date H'1 by the base transceiver station BTS1. A corresponding reception step 11 then enables the station BTS1 to compute the propagation time $\tau 1$ indeed, the different dates H'1–H1 correspond to twice $\tau 1$ and to the waiting duration R. The step 11 then ends with the sending of the piece of information $\tau 1$ (or a corresponding piece of information) from the base transceiver station BTS1 to the mobile telephone 4. The piece of information $\tau 1$ may be sent at the same time as a complementary piece of information of absolute time H4 represented by a piece of information h4 contained in the return message. As shall be seen hereinafter, this second absolute time is optional. It enables the mobile telephone to assess the drift of its internal clock with respect to the absolute clock 8 sent by the base transceiver station BTS1.

During a following step 12, the mobile telephone 4 then receives the information 1 corresponding to the second sending operation by the base transceiver station BTS1. On the basis of this piece of information $\tau 1$, the mobile telephone is capable of carrying out a rigorous setting of its relative date D1 with respect to the absolute date H1. In practice, it must see to it that a piece of information h1+$\tau 1$ is equal to a piece of information representing its relative time D1.

This knowledge of $\tau 1$ already enables the mobile telephone 4 to know the distance d1 between itself and the base transceiver station BTS1. Furthermore, the setting gives it a piece of information on the setting of the absolute time.

The operation 12 continues or is done at the same time, by the reception of the transmitted messages coming from at least two other base transceiver stations BTS2 and BTS3. For example, the base transceiver station BTS2 sends a message at an absolute date H2 containing a piece of information h2 pertaining to this absolute date H2. This message from the base transceiver station BTS2 is received by the mobile telephone at a relative date D2. Similarly, a third base transceiver station BTS3 sends a message at a date H3 comprising the information h3 received at a relative date D3 by the mobile telephone 4. The absolute dates H2 an H3 are prepared with respect to one and the same absolute clock known to the base transceiver stations BTS2 and BTS3 and corresponding exactly to that of the base transceiver station BTS1. For example, this absolute clock is produced for all the base transceiver stations by the clock 8.

It is then possible to write the following results:

H1=D1+Δ–(1

H2=D2+Δ–(2

H3=D3+Δ–(3

In these expressions ( represents the lag of the relative clock of the mobile telephone 4 with respect to the absolute clock of the base transceiver station BTS1. The absolute clock of the base transceiver station BTS1 is known by the other base transceiver stations BTS2 and BTS3. For example, this knowledge is provided by the bus 1 which sends them pieces of information on time.

From the steps 9 to 11, it can be deduced, since $\tau 1$ is known by computation at least during the step 11 in the base transceiver station BTS1, that A is also known. Thus, by applying the second and third formulae referred to here above, the knowledge of D2 and D3 (as well as H2 and H3 represented by h2 h3) enables the direct computation of $\tau 2$ and $\tau 3$. We are then in a configuration shown in FIG. 1 pertaining to the principles of the prior art. The coordinates X, Y, Z can then easily be computed.

The computation 13 of its position X, Y, Z can be done by the mobile telephone 4 in a preferred mode. In this case, the mobile telephone 4 should furthermore know the coordinates of the base transceiver stations BTS1, BTS2 and BTS3. To this end, subsequently (or prior) to the step 9 for sending the piece of information h1, the base transceiver station BTS1 may, in a step 14, send the pieces of information x1, y1, z1 corresponding to its coordinates. Similarly, the stations BTS2 and BTS3 may send pieces of information of the same type during the steps 15 and 16 respectively, prior to the operation 13.

Normally, the mobile telephone has a special link with a base transceiver station in an allocated channel. Especially in the GSM system, this allocated channel has a temporal window and, for each temporal window, a working frequency. Furthermore, from one frame to the other, for one and the same temporal window, the working frequency changes according to a pseudo-random mode known to the base transceiver station and the mobile telephone.

Preferably, the sending of the absolute time by the base transceiver station BTS1 to the mobile telephone will take place in the preferred conversation channel. As the case may be, since the number of bits needed to transmit the value of an absolute time H1 may be great, it may be planned (see FIG. 3, timing diagram shown above) to send a piece of information on an absolute time H1 in the form of fragmentary pieces of information h1, h'1, etc. during several successive frames. In this case, the mobile telephone will have a protocol (a program) with which it will be able to know the date H1 when it receives one particular piece (the last one) of these fragmentary pieces of information. For example, these different fragmentary pieces of information are encoded on different numbers of bits. A first fragmentary piece of information representing an absolute time modulo 8 is encoded on three bits. A second part encoded on six bits represents one minute in the time corresponding to this hour, a third part on six bits represents a particular second in this minute and so on and so forth, the least significant bits containing the requisite precision (at least about one microsecond). It is thus possible, with 30 bits, to go down to a precision of about one nanosecond.

Another way for a mobile telephone to know the position xi, yi, zi of the base transceiver stations is to transmit these pieces of information xi, yi, zi to the mobile telephone, when it reaches an environment of base transceiver stations, in correspondence with the identification BTSi pertaining to these base transceiver stations. In this case, the message for the transmission of the information on absolute time, instead of the coordinates xi, yi, zi, will comprise a piece of information on the identification of the base transceiver station, it being known that the mobile telephone also knows the coordinates of this base transceiver station.

To further improve the computation of the position of the mobile telephone, it can be envisaged, especially in an urban environment where the number of base transceiver stations that can be received by a mobile telephone is great, to perform a computation for taking the average of positions, especially a computation of extraction by the least error squares method. In this case, especially, additional base transceiver stations, in particular BTS4, BTSi and so on and so forth, will be brought into play. In an urban environment, the number of base transceiver stations is high not only because of the difficulties of propagation but especially because of the number of simultaneous calls that have to be made at the same time, requiring the setting up of multiple base transceiver stations distributed with a high density.

Each of the base transceiver stations, while communicating with a batch of assigned mobile telephones, furthermore possesses a signalling or broadcast control channel (BCCH) for the permanent or periodic broadcasting of the reporting signals.

This broadcast control channel (as it is called in the GSM standard for example) is used especially to incorporate mobiles entering the field of the base transceiver station. This incorporation requires at least partial traffic with the mobile telephone entering the BCCH channel at a beacon frequency, with the allocation of a specific conversation channel. This partial traffic generally comprises the broadcasting of the TA information to the address of the incoming mobile telephone. This mobile telephone then sets its internal clock in synchronization so that its responses are received in a window allocated to it, and with an appropriate sending level.

In the invention, the existence of this broadcast control channel BCCH will be used to obtain the transmission by the other base transceiver stations, BTS2, BTS3, BTS4, BTSi, periodically of the message hi and absolute date Hi. In a manner known per se, these absolute time messages are complemented by a piece of information on the identity of the base transceiver station that sends the message. In a known way, the different signalling channels BCCH are located in different beacon frequency bands. The mobile telephones then have multiple receivers capable together of receiving all the transmissions from these base transceiver stations to their broadcast control channels.

A piece of information of this type is already used in the prior art especially to inform the management central circuit 2 that it is necessary to end a call between a mobile telephone and a base transceiver station. It is necessary to transfer it to a base transceiver station other than the one that managed it previously, owing to the deterioration (caused by the distance) of the conditions of communication between this mobile telephone and this base transceiver station. This means that, in practice, mobile telephones are capable of receiving as many messages (that can be used for their localizing) from base transceiver stations as they are capable of picking up broadcast control channels. FIG. 1 thus shows that, from three base transceiver stations BTS1 to BTS3, it is possible to determine a triangle with vertices 17, 18, 19 at which there is the mobile telephone 4. It can furthermore be assumed that the official position of the mobile telephone 4 will be that of the center of gravity of this triangle: the meeting point of the median lines of this triangle. If another base transceiver station, for example the base transceiver station BTS4, is brought into action, then it is possible to compute the coordinates X Y Z by choosing those for which the distance between a candidate and a base transceiver station minus the measured distance di squared, and added to the differences, squared, for the other base transceiver stations is the minimum. In this case, we obtain far greater precision.

Figure 4:
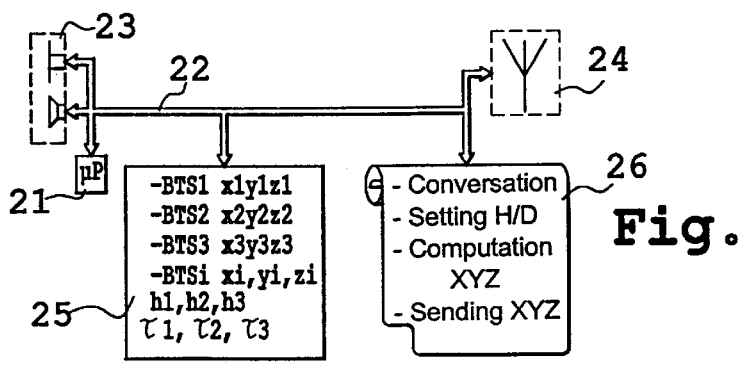
FIG. 4 shows the minimum modification of the structure of the mobile telephones to enable them to implement the method of the invention.

FIG. 4 provides a schematic view of the contents of a mobile telephone that can be used in the method of the invention. This mobile telephone essentially has a microprocessor 21 linked by a bus 22 with an exchange interface 23 (symbolically shown by a microphone and a loudspeaker), a transmission circuit 24, a working memory 25 and a program memory 26. The program memory 26 essentially, and in a known way, has a conversation program enabling the user of the mobile telephone to set up calls with other partners. According to the invention, the program 26 will have a sub-program for setting the relative clock D with respect to the absolute clock H. It will also comprise a sub-program to compute the coordinates X, Y, Z. Preferably, it will also have a sub-program for sending these coordinates X, Y, Z during a step 27 (FIG. 2) to the central circuit 2 for the management of the network. This sending of the coordinates X, Y, Z will especially make it possible to find someone in difficulty, localize a stolen telephone set or transmit messages to the user on the geographical zone in which he is located. The call 27 may be made on the basis of a request coming from the central circuit 2, especially when the circuit interprets a distress call.

In the memory 25, there will be have been stored especially information on the identity BTSi of these base transceiver stations with which the mobile telephone has been linked. This information will have been stored in correspondence with their localization xi, yi, zi. The working memory 25 will also comprise pieces of information hi received as well as the results of computation of the computed propagation times (i. In practice, within the framework of the GSM with broadcasting control transmission channels having a width of 200 KHz, and using a GSMK type modulation (Gaussian Minimum Shift Keying), the binary bit rate of the modulation is about 270.833 kilobits per second. The measurement precision of the dates D1, D2, D3 etc. is proportional to the duration of a bit time. Indeed, the electronic circuits of the instruments are designed to measure differences of state. These differences of state are supposed to hold during a period: to simplify the description, this duration is the duration of the bit. In other words, when a state is measured, it is not known whether it is at the beginning of the duration of the bit or at the end of the duration of the bit. Typically, present-day systems give a precision of about one-quarter of the bit time. With the bit rate announced by the GSM system, this provides for precision for the dates Di of about one microsecond. This leads to an error of appreciation of the distances d1 to d3 of about 300 meters each.

It may be that this precision, while it is greater than the precision that can be obtained with TA type prior art systems which was in the range of 1100 meters, may be insufficient. As seen here above, the precision can be increased by increasing the number of base transceiver stations contributing to the determining of the X, Y, Z coordinates. However, it is not always possible to envisage a large number of base transceiver stations contributing to this measurement. Furthermore, the only places where a large number of base transceiver stations can be envisaged are the urban environments where the problem of multiple paths arises.

The problem of multiple paths results from the reflections and broadcasting of waves sent by the base transceiver stations and the mobile telephones to obstacles present in their environment (buildings, hills, etc.) before these waves reach their destination, namely the mobile telephone or the base transceiver station. These multiple paths introduce inter-symbol interference (ISI). Although no system is specified in the GSM standard to curb this interference, most if not all receivers use Viterbi equalizers. The drawback of a Viterbi equalizer is that it cannot be used to ascertain the shortest path taken by the waves received. The shortest path ultimately represents the distances di sought.

In the field of CDMA (Coded Division Multiple Access) type mobile telephony, to simplify the description, the sequences of bits to be transmitted are multiplied by a very fast pseudo-random type sequence (in practice at least ten times faster than in the case of the GSM) whose distribution is known. These essential characteristics of a CDMA encoding are therefore, firstly, continuous sending and, secondly, modulation frequencies that are far higher than those of the GSM mode. The multiplication of the information to be transmitted by the pseudo-random sequence, at very fast bit rate, is actually a frequency modulation rate far higher than the modulation rate that can be used in GSM mode. Thus, a precision of about 30 meters is easily attained for the localizing of the mobile telephone. In the invention, it is preferably sought to increase the modulation rate. From this viewpoint, the invention is designed more particularly for CMDA type encoding.

Figure 5:
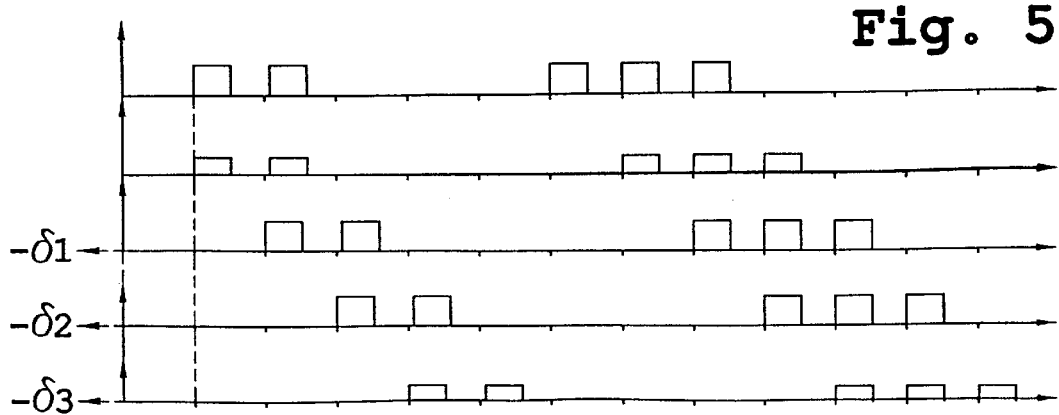
FIG. 5 shows a schematic view of an improvement of the invention when the radioelectric access technique is of the CDMA type.

FIG. 5 for example shows the bit rates sent according to an encoding of this kind. This figure shows two bits at one followed by three bits at zero and three bits at one. Independently of the propagation times, these strings of bits may be received at dates delayed by 0, $\delta 1$, $\delta 2$ or $\delta 3$ owing to the reflections. As the case may be, the received level is low, medium, medium and then again low. In fact, these propagations in four different paths together reach the addressee. The addressee therefore receives the sum of the signals shown. To carry out the decoding, with a rack receiver, a correlation is made by adding up the string of received bits with strings of received bits offset by $\delta 1$, $\delta 2$ and $\delta 3$.

For a known stringing sequence, it is furthermore possible to carry out a correlation by multiplication of the received sequence with the expected theoretical sequence. In doing so, it is possible, with a decoder of this type, not only to find the message that has been sent but also, despite its attenuation, know the first total representation of this transmitted message which represents the minimum distance, namely the distance of the direct path. This is why the CDMA type encoding which enables the use of rack decoders, is preferred.

Rather than having all the localizing computations performed by the mobile telephone, it is possible to ask the mobile telephone to send information corresponding to D1, D2, D3 and D4 to the base transceiver station BTS1 so that it computes or makes the circuit 2 compute the desired localization.

If there is only a limited number of base transceiver stations available and if the distances measured, allowing for acceptable measurement errors, do not result in a common localization, a localization matched with a piece of reliability information will be produced. The reliability information will correspond for example to a ratio between a mean measured distance and a theoretical obtainable distance.

Rather than sending a piece of information r on the duration of lag R, it may be preferred to have the mobile telephone send a stringing sequence known to the base transceiver station so that it can accurately decode the date H'1 of reception of the return message and find it without difficulty.

During the second sending operation from the base transceiver station BTS1 to the mobile telephone, it is planned that this station will indicate a second absolute time H4 in the form of a piece of information h4. Thus, the mobile telephone knows the pieces of information h1 and h4 as well as the reception dates D1 and D4. It can then have knowledge, in addition to the shift, of the drift of its internal clock with respect to its absolute clock. This drift is a second-order error with respect to the shift A. It also makes it possible to take account of the shifts of the mobile telephone between the two dates D1 and D4 (or H1 and H4). However, given the speed at which the different sending operations will be performed (in practice everything happens in about 100 milliseconds), this clock drift will be essentially representative of the drift of the setting of the clock of the mobile telephone 4.

As a variant, rather than making the absolute clock of the circuit 2 known to the different stations BTS1 to BTS3, it is possible to use the mobile telephone itself as means of exchange. In this case, the mobile telephone 4 will set up a to-and-fro exchange protocol with each of the base transceiver stations BTS1 to BTS3 (or BTSi) like the one described for the base transceiver station BTS1. In this case, the mobile telephone 4 will finally know which are the clocks of the different base transceiver stations. This will amount to making it know an absolute clock common to these base transceiver stations and the shifting of the clock of these base transceiver stations with respect to this absolute clock that is valid for all the base transceiver stations. In this case, the mobile telephone will be able to compute a clock difference A1, A2 and A3 with respect to its own clock. This own clock, hitherto called a relative clock, then becomes the absolute clock of this system, at least with regard to the measurement of distance. In this case, given the fact that the mobile telephone 4 may have to converse with a distant base transceiver station, it is possible to choose at least temporarily to neutralize an optimum power limit so that the calls sent from the mobile telephone reach the base transceiver stations BTS2 and BTS3, which are further away, in an efficient manner.

What is claimed is:

1. A method for the localizing of a mobile telephone in a network of base transceiver stations comprising the following steps:

a first, second and third base transceiver station are located, a first, second and third duration of propagation between the first, second and third base transceiver stations and the mobile telephone are measured respectively, the distances between this first, second and third base transceiver stations and the mobile telephone are deduced therefrom, and the mobile telephone is localized with these distances and these locations of base transceiver stations, wherein, one and the same absolute clock is made known in order to set the times of the base transceiver stations, the first base transceiver station sends a first piece of information h1 of an absolute date to the mobile telephone, this first information h1 corresponding to a first absolute date H1 for this first base transceiver station, the mobile telephone receives this first piece of information h1 of absolute date and, after a period of waiting known to the first base transceiver station, it sends a response signal, the first base transceiver station receives this response signal at another absolute date H'1, the first base transceiver station computes a piece of information on propagation τ1 between itself and the mobile telephone on the basis of the difference between the two absolute dates H1 and H'1 and of the known waiting duration, the first base transceiver station sends the mobile telephone the piece of information on propagation τ1, the second and third base transceiver stations send a second piece of information and third piece of information h2 and h3 on absolute date, and the mobile telephone is localized on the basis of these pieces of information h1, h2, h3 on absolute date received by the mobile telephone, their reception date and the information on propagation.

2. A method according to claim 1, wherein the computation for localizing the mobile telephone is computed by said mobile telephone.

3. A method according to claim 2, wherein:

the mobile telephone, on request, sends its computed position to a base transceiver station.

4. A method according to claim 1, wherein the computation for localizing the mobile telephone is done by a circuit attached to a base transceiver station.

5. A method according to claim 1, wherein:

the speed of modulation of the information transmitted by the base transceiver stations and/or the mobile telephone is modified to improve the precision.

6. A method according to claim 1, wherein:

stations other than the first three base transceiver stations are made to send pieces of information on absolute date, and the mobile telephone is localized with precision by a least error squares method.

7. A method according to claim 6, wherein:

to make them known, the different base transceiver stations are connected to one another by a PCM link, or the base transceiver stations are connected to a GPS type system.

8. A method according to claim 6, wherein:

the pieces of information on propagation are reiterated with the other base transceiver stations to make an absolute common clock known by the mobile telephone and, a power optimization is eliminated temporarily.

9. A method according to claim 1, wherein a degree of reliability of the localization is measured.

10. A method according to claim 1 wherein, as a piece of information, the response signal comprises a sequence known to the first base transceiver station.

11. A method according to claim 1 wherein:

the communications protocol between the base transceiver station and the mobile telephone is a CDMA type protocol, and wherein the shortest path of propagation between a base transceiver station and the mobile telephone is found by means of a rack receiver.

12. A method according to claim 1, wherein the first base transceiver station sends the mobile telephone, with the information on propagation τ, a fourth piece of information h4 on absolute date.

13. A method according to claim 1, wherein:

the absolute time is sent gradually and/or the pieces of information on absolute time are sent on a broadcast control channel.

* * * * *